(12) United States Patent
Caviglia

(10) Patent No.: US 8,391,133 B2
(45) Date of Patent: Mar. 5, 2013

(54) SYSTEM AND METHOD FOR AUTOMATIC RESET OF PRE-PROGRAMMED CIRCUITS IN CASE OF FAILURES IN TRANSPORT NETWORKS

(75) Inventor: Diego Caviglia, Savona (IT)

(73) Assignee: Ericsson AB, Stockholm (SE)

( * ) Notice: Subject to any disclaimer, the term of this patent is extended or adjusted under 35 U.S.C. 154(b) by 1428 days.

(21) Appl. No.: 10/596,347

(22) PCT Filed: Dec. 7, 2004

(86) PCT No.: PCT/EP2004/053318
§ 371 (c)(1),
(2), (4) Date: Apr. 16, 2007

(87) PCT Pub. No.: WO2005/060134
PCT Pub. Date: Jun. 30, 2005

(65) Prior Publication Data
US 2007/0253325 A1    Nov. 1, 2007

(30) Foreign Application Priority Data
Dec. 12, 2003  (IT) .............................. MI2003A2443

(51) Int. Cl.
*G01R 31/08* (2006.01)
(52) U.S. Cl. ........................................ 370/217; 370/225
(58) Field of Classification Search .................. 370/345, 370/468, 225, 226, 227, 228, 216, 217, 221, 370/222, 223, 224, 535, 539, 541, 220, 218
See application file for complete search history.

(56) References Cited

U.S. PATENT DOCUMENTS

| | | | | |
|---|---|---|---|---|
| 5,437,059 A | * | 7/1995 | Murakami et al. | 455/503 |
| 6,163,526 A | * | 12/2000 | Egoshi | 370/228 |
| 6,295,146 B1 | | 9/2001 | Nathan et al. | |
| 6,542,934 B1 | * | 4/2003 | Bader et al. | 709/239 |
| 2002/0141332 A1 | | 10/2002 | Barnard et al. | |
| 2003/0112821 A1 | * | 6/2003 | Cleveland et al. | 370/468 |

OTHER PUBLICATIONS

"Types and Characteristics of SDH Network Protection Architectures" ITU-T Telecommunication Standardization Sector of ITU, Geneva, CH, Jul. 10, 1995, pp. A-B, I-III, 1-91, XP000672074.

* cited by examiner

*Primary Examiner* — Kevin C Harper
*Assistant Examiner* — Samina Choudhry
(74) *Attorney, Agent, or Firm* — Coats & Bennett, P.L.L.C.

(57) ABSTRACT

A network system comprises at least one input TNE (10) and one output TNE (11) interconnected by circuits in the network (20). Each TNE in the protection step comprises a traffic selector (22, 23) switchable between listening to the traffic input from a work circuit (13, 14) and listening to the traffic input from a reset circuit (18, 19) and a Split module (21, 24) allowing sending of a same traffic output either to a work circuit or to a reset circuit. Each TNE comprises in addition an agent (25, 26) termed ASTN agent commanding activation and deactivation of the reset circuit and switching of the traffic selector between work circuit and reset circuit. Each of the two ASTN agents can emit an "Activate" message to command activation of the reset circuit and signal to the other agent completed activation of the reset circuit and a "RevertRequest" message for signaling to the other agent the desire to deactivate the reset circuit previously activated, and a "Revert" message for commanding deactivation of the reset circuit after reception of a "RevertRequest" message sent to it by the other agent.

16 Claims, 1 Drawing Sheet

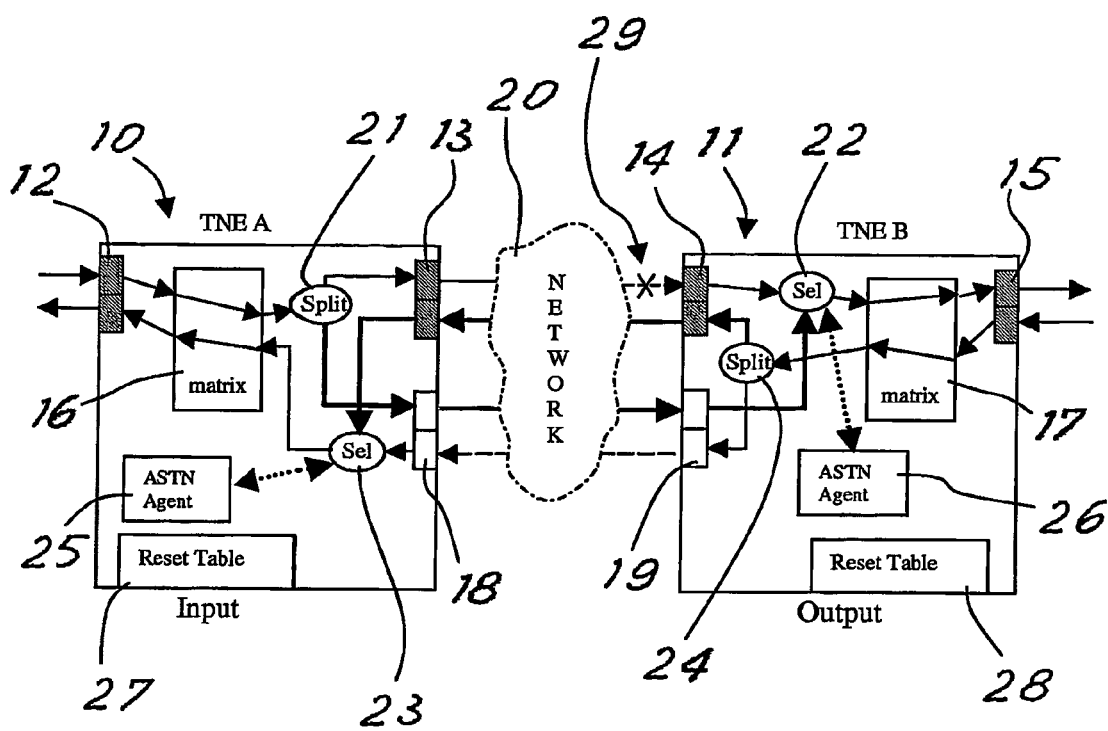

SYSTEM AND METHOD FOR AUTOMATIC RESET OF PRE-PROGRAMMED CIRCUITS IN CASE OF FAILURES IN TRANSPORT NETWORKS

The present invention relates to methods and systems for automatic reset of pre-programmed protection circuits in case of returns of transport network failures.

One of the most important concepts in the management of networks is ensuring survival of the network i.e. of the traffic transported by it. When there are node or connection failures, any circuit involved should be repaired as soon as possible (the term circuit is intended to mean the entity transporting the traffic).

Because of the enormity of traffic the networks have to transport, traffic resulting from the continuous growth of data-oriented applications, survival of the network has become a question of extreme importance. In addition, there are continuous thrusts for maximizing efficiency and minimizing costs that such survival from failure involves. Indeed, the conventional protection diagrams, mainly used in loop networks, consume excessive band. Other protection diagrams must be developed in order to satisfy the need for survival, especially in meshed networks.

In today's transport networks, very fast reset mechanisms such as for example 1+1 diagrams with reset times on the order of tenths of a millisecond exist but entail great network resources consumption since for each possible circuit in the network it is necessary to provide a reset circuit dedicated exclusively thereto.

It has been proven that shared meshed networks require much less additional capability as compared with loop networks but in return in known architectures there is a longer reset time of the service compared with loop networks.

A first solution proposed in the prior art to make reset faster was that of implementing the reset mechanism called 'pre-programmed' in the Transport Network Element (TNE). This mechanism calls for calculating the reset path and reserving the resources in advance so that when a failure occurs it is only necessary to activate the reset paths already provided to replace the failed section. The benefit lies in the fact that more than one circuit can share the reserved resources.

In the implementation of pre-programmed reset mechanisms, there have been proposed in the prior art systems of detection of the appearance of failures, activation of the pre-programmed reset path and, on disappearance of the failure, deactivation of the reset path to return to use of the normal work path.

Said systems are however generally usable only in case of strictly two-way failures, i.e. failures which by definition can involve only both directions of communication simultaneously and which are removed in both directions simultaneously. In such systems the fact that a work path is reactivated only in one direction causes the erroneous and untimely removal of the pre-programmed reset path to lose the traffic in the other direction, still failed, until the defect is detected as a new failure and a pre-programmed reset path is again activated.

The general purpose of the present invention is to remedy the above-mentioned shortcomings by making available methods and systems satisfactorily fast and with low consumption of resources for pre-programmed reset in case of failures in transmission networks and which would avoid transmitted data losses even when there is a one-way reset of the failure.

The solutions in accordance with the present invention apply mainly to Synchronous Digital Hierarchy (SDH) transport networks. This is due to the widespread use of this type of network. But it is provided that the same procedures can be applied to other data transport network types with minimal changes easily imaginable to those skilled in the art.

In view of this purpose it was sought to realize in accordance with the present invention a network system comprising at least one input transport network element and one output transport network element interconnected by circuits in the network with each transport network element comprising a traffic selector switchable between listening to the traffic input from a work circuit and listening to the traffic input from a reset circuit and a Split module that allows sending of a same traffic output either to a work circuit or to a reset circuit with each transport network element comprising in addition an agent termed ASTN agent that commands activation and deactivation of the reset circuit and switching of the traffic selector between the work circuit and the reset circuit with each agent being able to emit into the network an Activate message to command activation of the reset circuit and signal to the other agent completed activation of the reset circuit, and a RevertRequest message for signaling to the other agent the desire to deactivate the reset circuit previously activated, and a Revert message for commanding deactivation of the reset circuit after reception of a RevertRequest message sent to it by the other agent.

Again in accordance with the present invention it is sought to realize a method for activation and deactivation of a pre-programmed reset path in a transmission network between two input and output transport network elements in which there is an agent, termed ASTN agent, commanding activation and deactivation of the reset circuits and each agent being able to emit the "Activate" messages which an agent sends for commanding activation of the reset circuit i.e. to interconnect the reserved resources, "RevertRequest" which an agent sends for signaling to the other agent its desire to deactivate the reset circuit, and "Revert" which an agent sends for commanding deactivation of the reset circuit after reception of a "RevertRequest" sent it by the other agent.

To clarify the explanation of the innovative principles of the present invention and its advantages compared with the prior art there is described below with the aid of the only drawing annexed a possible embodiment thereof by way of non-limiting example applying said principles.

With reference to FIG. 1, a block diagram of a network in accordance with the present invention is shown therein with Transport Network Element (TNE) input and output elements highlighted and designated by reference numbers 10 and 11 respectively interconnected by a circuit in the network. In the network there is implemented a pre-programmed reset diagram i.e. with path calculation and resource selection accomplished before the failure and resource allocation accomplished after the failure. In their general lines the pre-programmed reset systems are well known to those skilled in the art and are not further described nor shown. In general, pre-programmed reset circuits are implemented by means of an input-output Sub Network Connection Protection (SNCP) and by means of an interconnection on the transiting Transport Network Elements (TNEs). An appropriate pre-determined message sent in the network allows activation or deactivation on command of a pre-programmed protection circuit.

The TNEs comprise a plurality of input and output traffic transit ports. The ports can be selectively interconnected by means of an interconnection matrix 16, 17 for the normal network functions. For the sake of simplicity in the figure the ports 12, 13, and 14, 15 interconnected to form a work circuit for normal network traffic are highlighted. Also highlighted in the figure are input/output ports 18, 19 that are part of a pre-programmed reset circuit of the work circuit in the network 20 that interconnects the ports 13, 14 of the TNE (through a certain number of transit TNEs not shown).

The TNEs also comprise "split" modules 21, 22 that make it possible to send one same traffic to two ports (one for work and one for reset) and Sel modules 23, 24 that select on command the traffic from two sources or input ports (one for work and one for reset) to send it to the matrix. These modules can of course be the software type and created as needed.

Command of the selection module for choosing of the source is done by another software module 25, 26 enclosed in the TNE and termed ASTN agent An ASTN agent is the module that implements the ASTN protocols and procedures. The term ASTN is used in the technical literature to indicate "Automated Switched Transport Network". In accordance with the present invention, for activation and deactivation functions of the reset circuits the ASTN agents of the TNE interconnected modules exchange the following three signals or messages:

(a) Activate: which an ASTN agent sends to command activation of the reset circuit i.e. to interconnect the reserved resources;
(b) RevertRequest: which an ASTN agent sends to signal to the other ASTN agent the desire to remove its own pre-programmed SNCP and eliminate the reset circuit; and
(c) Revert: which an ASTN agent sends to command release of the reset circuit For the purposes of the present invention the so-called Finite State Machine (FSM) that is created in the TNE has two interest statuses, i.e. the so-called "AutoSwitch" status and the "NoRequest" status. The NoRequest status means that no alarm is visible from the TNE and therefore the traffic selector (Sel) listens to the traffic on the work circuit. The AutoSwitch status means that an alarm is detected by the TNE and therefore the traffic selector (Sel) listens to the traffic on the reset circuit.

In a preliminary step (prior art and therefore readily imaginable to those skilled in the art and not further described) operational or work circuit creation is done through the network and reservation of the resources for the corresponding pre-programmed reset circuit is accomplished.

At the end of the preliminary step operations the network is in the status illustrated diagrammatically in the figure. The work circuit between the input/output TNEs is active and all the necessary resources in case of failure are reserved but not yet interconnected. The data needed to implement the interconnection are memorized in a so-called Reset Table indicated diagrammatically by reference numbers 27, 28 and whose structure and management are known to those skilled in the art.

The data contained in the reset table also allow propagation of the Activate message along the network TNEs.

As soon as an Activate message is received by the TNEs the Terminated Points (Tp) reserved for resetting are interconnected.

In case of failure (or alarm) on the work connection, three situations can occur. If only the ASTN agent of the input TNE detects the connection fall, the failure is one-way on the connection from the output to the input. If only the ASTN agent of the output TNE detects the connection fall, the failure is one-way on the input to output connection. If the agents of both the TNEs detect the connection fall, the failure is two-way i.e. on both the input to output and output to input connections.

However that is, the ASTN agent that detects the failure starts the set-up signal for the reset circuit and emits an Activate message, and after creating or activating its own Split module the Selector will also be moved to listen to the protection circuit traffic. This way, the Activate message is sent through the ports 18 or 19 and along the reset path. In other words, the agent that detects the failure creates the SNCP and emits the Activate message to request activation of the reset circuit, which is two-way in any case. The Activate signal is propagated in the network and upon reception of the Activate signal the transit TNEs interconnect the reserved resources until they reach the other input or output TNE.

If the failure is one-way on the output to input connection, the Activate signal is sent to output while if the failure is one-way in the other direction the Activate signal is sent to input. In case of two-way failure, both input and output send Activate signals to output and input respectively.

In addition, upon detection of the alarm, the FSM of the SNCP created by the ASTN input or output agent that detects the alarm goes into AutoSwitch status.

FIG. 1 shows by way of example the situation at the end of the above-described steps for the case of a one-way failure seen only by the output TNE 11 (failure on the input to output connection represented by the interruption of the circuit indicated diagrammatically by reference number 29).

As may be seen in the figure, the work connection at the input to output is replaced by the corresponding two-way reset connection.

It should be noted that an ASTN agent is based only on local data to decide whether to activate a reset circuit and merely has to emit the Activate message.

After termination of the alarm, i.e. the work circuit is reset, the reset circuit release procedure must take into account the fact that a single ASTN agent does not possess enough data to release the reset circuit correctly. Indeed, if one of the two TNEs detects the return to activity of the work circuit entering on its side it is no guarantee that the work circuit is efficient in the other direction also. If the TNE were to remove the reset circuit, there would be a loss of traffic until the other TNE detected lack of the input connection and reactivated a new reset circuit.

A reset circuit can therefore be released only when both the FSMs of the input and output SNCPs are in the NoRequest status i.e. both the selectors Sel are listening on the work circuit and therefore the work circuit is active in both directions. But there is no assurance in advance that the two FSMs of the SNCPs are in the same status. Indeed, it is clear that there are sequences of events leading to having different statuses in the two FSMs of the two TNEs.

In accordance with the principles of the present invention the problem is solved very efficiently by requiring that every time one of the two SNCP FSMs goes into NoRequest status, a RevertRequest message is sent to the other end of the circuit and when an ASTN agent receives a RevertRequest it replies with a Revert (which the reset circuit releases) only if its SNCP FSM is in the NoRequest status.

This allows having a release of the reset circuit resources only when the connection has actually been re-established on the work circuit. There is thus reliable operation with either one-way or two-way failures.

To summarize, the ASTN agents follow the following rules:
a) When an ASTN agent detects an input failure to the TNE, the FSM of its SNCP changes to the AutoSwitch status (the traffic selector Sel changes to listening to the traffic on the reset circuit). If the SNCP of the TNE is not already active, the agent creates the SNCP and emits the Activate message;

b) When an ASTN agent detects disappearance of the input failure, the FSM of its SNCP changes to the NoRequest status (the traffic selector Sel changes to listening to the traffic on the work circuit) and sends the RevertRequest message to the other end of the circuit;

c) When an ASTN agent receives a RevertRequest, it replies with a Revert (which the protection circuit releases) only if its SNCP FSM is in NoRequest status; and d) When an ASTN agent receives a Revert, it destroys its own SNCP.

All this makes it possible to manage indifferently a two-way failure, a one-way failure, or a sequence of a one-way failure in one direction followed by a one-way failure in the other direction and with repair of the failures in both directions at different times.

As an example, let us consider the most complex sequence of events caused by the appearance in succession of two one-way failures leading to the two-way interruption of the work circuit and which are then always repaired in succession.

In accordance with the principles of the present invention, upon appearance of such a sequence of events there would be the following actions.

1. A one-way failure is detected by the output TNE:
   (a) The output TNE sends the Activate message;
   (b) The output SNCP FSM goes into AutoSwitch status and therefore the corresponding selector Sel starts listening on the reset circuit;
   (c) The Activate message is propagated in the network with the transit TNEs that upon reception of the Activate message implement the interconnection on the reserved Tps until completion of the entire reset circuit; and
   (d) Upon reception of the activate message the input TNE implements its own SNCP. The status of the FSM of said SNCP is the NoRequest status because Input sees no alarms.

2. A one-way failure is detected by the input TNE:
   (a) No signal is sent in the network since the SNCP in the input TNE is already active; and
   (b) The input SNCP FSN goes into AutoSwitch status and therefore the corresponding selector Sel goes to listening on the reset circuit (already present). The output SNCP FSM remains in AutoSwitch status.

3. Disappearance of the alarm seen by the output:
   a) The output SNCP FSM goes to NoRequest status and therefore the corresponding selector Sel returns to listening to the reset work circuit;
   b) The RevertRequest message is sent to input;
   c) The transit TNEs forward the RevertRequest message without releasing the implemented reset circuit; and
   d) The input ASTN agent refuses the RevertRequest message because its SNCP FSM is in the AutoSwitch status) and does not send the Revert message.

4. Disappearance of the alarm seen by the input:
   (a) The Input SNCP FSM goes into the NoRequest status and therefore the corresponding selector Sel returns to listening on the reset work circuit;
   (b) The RevertRequest message is sent to output;
   (c) The transit TNEs forward the RevertRequest message without releasing the implemented reset circuit;
   (d) The output ASTN agent accepts the RevertRequest message because its SNCP FSM is in the NoRequest status;
   (e) The output SNCP is destroyed;
   (f) The Revert message is sent to the input;
   (g) The transit TNEs release the reset circuit upon propagation of Revert in the network. The Tps involved in the interconnection remain reserved on the basis of the pre-programming; and
   (h) The input TNEs receive the Revert message and destroy the SNCP.

At the end of the above-mentioned steps the reset circuit is returned to the same status it had at the end of the operational circuit creation procedure and of reservation of the resources for the pre-programmed reset circuit without any loss of traffic.

It is now clear that the predetermined purposes have been achieved by making available a reset structure and procedure making it possible to handle one-way and two-way failures with little expenditure of resources and satisfactory speed without loss of traffic even in case or partial reset.

Naturally the above description of an embodiment applying the innovative principles of the present invention is given by way of non-limiting example of said principles within the scope of the exclusive right claimed here. For example, even though the present invention is particularly applicable to an SDH transport network, other types of known networks can benefit from the present invention.

The invention claimed is:

1. A transport network element in a network system, the transport network element comprising:
   a traffic selector configured to switch the transport network element between receiving traffic over a primary traffic circuit and receiving traffic over a secondary traffic circuit;
   a split module configured to send traffic either to the primary traffic circuit or to the secondary traffic circuit; and
   an agent configured to control the traffic selector to switch between the primary traffic circuit and the secondary traffic circuit, and to control activation and deactivation of the secondary traffic circuit by exchanging messages with a corresponding remote agent associated with a remote transport network element, the agent being further configured to:
   switch the traffic selector to receive traffic on the secondary traffic circuit, and send an Activate message to the remote agent to activate the secondary traffic circuit if the secondary traffic circuit is not already activated, responsive to detecting a failure on the primary traffic circuit;
   switch the traffic selector to receive traffic on the primary traffic circuit, and send a RevertRequest message to the remote agent to request the remote agent to deactivate the previously activated secondary traffic circuit, responsive to detecting that the failure on the primary traffic circuit no longer exists; and
   send a Revert message to the remote agent to deactivate the secondary traffic circuit if the traffic selector is already switched to receive traffic on the primary traffic circuit, responsive to receiving a RevertRequest message from the remote agent.

2. The transport network element of claim 1 wherein the agent is configured to detect a failure at an input of the primary traffic circuit.

3. The transport network element of claim 1 wherein the agent comprises logic to implement a sub-network connection protection function having a NoRequest state and an AutoSwitch state.

4. The transport network element of claim 3 wherein the sub-network connection protection function, upon entering the NoRequest state, indicates that no failure is detected at an input of the primary traffic circuit and that the traffic selector is switched to receive the network traffic over the primary traffic circuit.

5. The transport network element of claim 4 wherein the sub-network connection protection function, upon entering the AutoSwitch state, indicates that a failure has been detected at the input to the primary traffic circuit and that the traffic selector is switched to receive the network traffic over the secondary traffic circuit.

6. The transport network element of claim 5 wherein the agent is configured to switch the sub-network connection protection function to the NoRequest state responsive to receiving a Revert message from a remote agent.

7. The transport network element of claim 1 wherein the network comprises an Synchronous Digital Hierarchy (SDH) transport network.

8. A method of operating a transport network element to activate and deactivate a pre-programmed secondary traffic path in a transmission network having an input transport network element and an output transport network element, each transport network element including an agent to control the activation and deactivation of a primary traffic circuit and a secondary traffic circuit between the input and output transport network elements, the method comprising:
switching to receive traffic on the secondary traffic circuit, and sending an Activate message from a first transport network element to a second transport network element to activate the secondary traffic circuit that interconnects the first and second transport network elements if the secondary traffic circuit has not already been activated, responsive to detecting a failure on the primary traffic circuit;
switching to receive traffic on the primary traffic circuit, and sending a RevertRequest message from the first transport network element to the second transport network element to request deactivation of the secondary traffic circuit at the second transport element, responsive to detecting that the failure on the primary traffic circuit no longer exists; and
sending a Revert message from the first transport network element to the second transport network element to deactivate the secondary traffic circuit at the second transport element if the secondary traffic circuit has been deactivated at the first transport element, responsive to receiving a RevertRequest message from the second transport network element.

9. The method of claim 8 further comprising:
detecting a failure at an input to a primary traffic circuit associated with the first transport network element;
activating a sub-network connection protection function at the first transport network element responsive to detecting the failure, the sub-network connection protection function assuming:
a NoRequest state to indicate that no failure is detected at the primary traffic circuit, and that the first transport network element is configured to receive network traffic over the primary traffic circuit; and
an AutoSwitch state to indicate that a failure has been detected at the primary traffic circuit, and that the first transport network element is configured to receive the network traffic over the secondary traffic circuit.

10. The method of claim 9 wherein activating a sub-network connection protection function comprises generating the sub-network connection protection function if the sub-network connection protection function does not already exist.

11. The method of claim 10 further comprising:
switching the sub-network connection protection mechanism to the AutoSwitch state responsive to detecting the error;
switching a traffic selector at the first transport network element to receive the network traffic over the secondary traffic circuit; and
sending the Activate message.

12. The method of claim 11 further comprising:
detecting when the failure no longer exists;
switching the sub-network connection protection function to the NoRequest status;
switching the traffic selector at the first transport network element to receive the network traffic over the primary traffic circuit; and
sending the Revert Request message to the second transport network element.

13. The method of claim 12 further comprising:
receiving a RevertRequest message at the first transport network element from the second transport network element; and
sending a Revert message to the second transport network element to deactivate the secondary traffic circuit if the sub-network connection protection mechanism is in the NoRequest status.

14. The method of claim 13 further comprising switching the sub-network connection protection function at the first transport network element to the NoRequest state responsive to receiving a Revert message from the second transport network element.

15. A network system having at least one input transport network element and at least one output transport network element that are interconnected by primary and secondary traffic circuits, each transport network element comprising:
a traffic selector configured to switch the transport network element between receiving traffic over a primary traffic circuit and receiving traffic over a secondary traffic circuit;
a split module configured to send traffic either to the primary traffic circuit or to the secondary traffic circuit; and
an agent configured to control the traffic selector to switch between the primary traffic circuit and the secondary traffic circuit, and to control activation and deactivation of the secondary traffic circuit by exchanging messages with a corresponding remote agent associated with a remote transport network element, the agent being further configured to:
switch the traffic selector to receive traffic on the secondary traffic circuit, and send an Activate message to the remote agent to activate the secondary traffic circuit if the secondary traffic circuit is not already activated, responsive to detecting a failure on the primary traffic circuit;
switch the traffic selector to receive traffic on the primary traffic circuit, and send a RevertRequest message to the remote agent to request the remote agent to deactivate the previously activated secondary traffic circuit, responsive to detecting that the failure on the primary traffic circuit no longer exists; and
send a Revert message to the remote agent to deactivate the secondary traffic circuit if the traffic selector is already switched to receive traffic on the primary traffic circuit, responsive to receiving a RevertRequest message from the remote agent.

16. The network system of claim 15 wherein the agent comprises logic to implement a sub-network connection protection function having a NoRequest state and a AutoSwitch state, and wherein:

the sub-network connection protection function, upon entering the NoRequest state, indicates that no failure is detected at an input of the primary traffic circuit and that the traffic selector is switched to receive the network traffic over the primary traffic circuit; and the sub-network connection protection function, upon entering the AutoSwitch state, indicates that a failure has been detected at the input to the primary traffic circuit and that the traffic selector is switched to receive the network traffic over the secondary traffic circuit.

\* \* \* \* \*